(12) United States Patent
Ahn et al.

(10) Patent No.: US 11,728,473 B2
(45) Date of Patent: Aug. 15, 2023

(54) POSITIVE ELECTRODE FOR RECHARGEABLE LITHIUM BATTERY, METHOD OF PREPARING THE SAME, AND RECHARGEABLE LITHIUM BATTERY INCLUDING THE SAME

(71) Applicant: Samsung SDI Co., Ltd., Yongin-si (KR)

(72) Inventors: Kiyong Ahn, Yongin-si (KR); Taehee Kwak, Yongin-si (KR); Jeuk Ha, Yongin-si (KR); Seonyoung Kwon, Yongin-si (KR); Yumi Song, Yongin-si (KR); Eunok Oh, Yongin-si (KR); Soonrewl Lee, Yongin-si (KR); Naoyuki Hase, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 50 days.

(21) Appl. No.: 17/186,502

(22) Filed: Feb. 26, 2021

(65) Prior Publication Data
US 2022/0093913 A1 Mar. 24, 2022

(30) Foreign Application Priority Data
Sep. 24, 2020 (KR) .................. 10-2020-0124255

(51) Int. Cl.
*H01M 4/36* (2006.01)
*C01G 53/00* (2006.01)
(Continued)

(52) U.S. Cl.
CPC ............ *H01M 4/364* (2013.01); *C01G 53/42* (2013.01); *H01M 4/525* (2013.01);
(Continued)

(58) Field of Classification Search
CPC combination set(s) only.
See application file for complete search history.

(56) References Cited

U.S. PATENT DOCUMENTS 6,589,499 B2 7/2003 Gao et al.
10,056,605 B2 8/2018 Oh et al.
(Continued)

FOREIGN PATENT DOCUMENTS

CN 101167209 A 4/2008
CN 101714630 A 5/2010
(Continued)

OTHER PUBLICATIONS

Advisory Action for U.S. Appl. No. 17/102,332 dated Jun. 7, 2022, 3 pages.
(Continued)

*Primary Examiner* — Daniel S Gatewood
(74) *Attorney, Agent, or Firm* — Lewis Roca Rothgerber Christie LLP

(57) ABSTRACT

A positive electrode for a rechargeable lithium battery includes a positive active material including small particle diameter monolith particles having a particle diameter of about 1 μm to about 8 μm and including a first nickel-based lithium metal oxide, and large particle diameter secondary particles having a particle diameter of about 10 μm to about 20 μm and including a second nickel-based lithium metal oxide. An X-ray diffraction peak intensity ratio (I(003)/I(104)) of the positive electrode is greater than or equal to about 3. A rechargeable lithium battery includes the positive electrode.

13 Claims, 3 Drawing Sheets

(51) Int. Cl.
*H01M 4/525* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2002/72* (2013.01); *C01P 2002/74* (2013.01); *C01P 2004/03* (2013.01); *C01P 2004/50* (2013.01); *C01P 2004/53* (2013.01); *C01P 2004/61* (2013.01); *C01P 2006/10* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2004/0058243 A1 | 3/2004 | Ohzuku et al. |
| 2007/0122705 A1 | 5/2007 | Paulsen et al. |
| 2008/0026292 A1 | 1/2008 | Paulsen et al. |
| 2008/0248391 A1 | 10/2008 | Wakasugi et al. |
| 2009/0029253 A1 | 1/2009 | Itou et al. |
| 2009/0258296 A1 | 10/2009 | Kawasato et al. |
| 2010/0081055 A1 | 4/2010 | Konishi et al. |
| 2011/0079752 A1 | 4/2011 | Park et al. |
| 2011/0226986 A1 | 9/2011 | Wang et al. |
| 2011/0240913 A1 | 10/2011 | Kim et al. |
| 2012/0085967 A1 | 4/2012 | Yokoyama et al. |
| 2012/0100429 A1 | 4/2012 | Sueki et al. |
| 2012/0261610 A1 | 10/2012 | Paulsen et al. |
| 2013/0316237 A1 | 11/2013 | Miki |
| 2014/0106212 A1 | 4/2014 | Choi et al. |
| 2014/0131633 A1 | 5/2014 | Ito et al. |
| 2014/0205906 A1 | 7/2014 | Kudo et al. |
| 2014/0212759 A1 | 7/2014 | Blangero et al. |
| 2015/0010819 A1 | 1/2015 | Lee et al. |
| 2015/0064577 A1 | 3/2015 | Natsui et al. |
| 2015/0093580 A1* | 4/2015 | Kobayashi ............ H01M 4/525 428/403 |
| 2015/0228971 A1 | 8/2015 | Kim et al. |
| 2015/0340686 A1 | 11/2015 | Sun et al. |
| 2016/0156020 A1 | 6/2016 | Tokoro et al. |
| 2016/0301069 A1 | 10/2016 | Kwak et al. |
| 2016/0380263 A1 | 12/2016 | Nakayama et al. |
| 2017/0222211 A1 | 8/2017 | Ryu et al. |
| 2017/0222225 A1 | 8/2017 | Kang et al. |
| 2017/0309910 A1 | 10/2017 | Jo et al. |
| 2017/0317342 A1 | 11/2017 | Kang et al. |
| 2017/0358799 A1 | 12/2017 | Gunji et al. |
| 2018/0026268 A1 | 1/2018 | Kim et al. |
| 2018/0048015 A1 | 2/2018 | Lee et al. |
| 2018/0108940 A1 | 4/2018 | Kwon et al. |
| 2018/0151876 A1 | 5/2018 | Kim et al. |
| 2018/0248180 A1 | 8/2018 | Liu et al. |
| 2018/0261842 A1 | 9/2018 | Park et al. |
| 2018/0316005 A1 | 11/2018 | Shin et al. |
| 2019/0020024 A1 | 1/2019 | Wang et al. |
| 2019/0044127 A1 | 2/2019 | Kim |
| 2019/0173076 A1* | 6/2019 | Kim ..................... H01M 4/525 |
| 2019/0355981 A1 | 11/2019 | Chang et al. |
| 2020/0127276 A1 | 4/2020 | Kim et al. |
| 2020/0185714 A1 | 6/2020 | Han et al. |
| 2020/0295368 A1 | 9/2020 | Kong et al. |
| 2022/0029147 A1 | 1/2022 | Ogawa et al. |
| 2022/0059836 A1 | 2/2022 | Hiratsuka et al. |

FOREIGN PATENT DOCUMENTS

| | | |
|---|---|---|
| CN | 107251282 A | 10/2017 |
| CN | 112750999 A | 5/2021 |
| EP | 1876664 A1 | 1/2008 |
| EP | 2169745 A1 | 3/2010 |
| EP | 3425703 B1 | 9/2019 |
| EP | 3647269 A1 | 5/2020 |
| JP | 2001-167761 A | 6/2001 |
| JP | 2013-038022 A | 2/2013 |
| JP | 2013-120676 A | 6/2013 |
| JP | 2015-076397 A | 4/2015 |
| JP | 2016-51503 A | 4/2016 |
| JP | 2016-76294 A | 5/2016 |
| JP | 2018-92931 A | 6/2018 |
| JP | 2018-532236 A | 11/2018 |
| JP | 6544951 B2 | 7/2019 |
| KR | 2003-0045853 A | 6/2003 |
| KR | 10-2006-0105039 A | 10/2006 |
| KR | 10-2009-0032138 A | 3/2009 |
| KR | 10-2010-0130522 A | 12/2010 |
| KR | 10-2011-0109879 A | 10/2011 |
| KR | 10-1154880 B1 | 6/2012 |
| KR | 10-1244050 B1 | 3/2013 |
| KR | 10-2014-0025597 A | 3/2014 |
| KR | 10-1452950 B1 | 10/2014 |
| KR | 10-1593401 B1 | 2/2016 |
| KR | 10-1595322 B1 | 2/2016 |
| KR | 10-1604509 B1 | 3/2016 |
| KR | 10-2016-0049519 | 5/2016 |
| KR | 10-2016-0129764 A | 11/2016 |
| KR | 10-2017-0063408 A | 6/2017 |
| KR | 10-2017-0093085 A | 8/2017 |
| KR | 10-1785262 B1 | 10/2017 |
| KR | 10-2018-0059736 A | 6/2018 |
| KR | 10-2018-0121267 A | 11/2018 |
| KR | 10-2019-0006906 A | 1/2019 |
| KR | 10-2019-0065963 A | 6/2019 |
| KR | 10-1989399 B1 | 6/2019 |
| KR | 10-2020-0043612 A | 4/2020 |
| KR | 10-2020-0070649 A | 6/2020 |
| KR | 10-2144056 B1 | 8/2020 |
| KR | 10-2020-0110027 A | 9/2020 |
| KR | 10-2175126 B1 | 11/2020 |
| WO | WO 2015/053580 A1 | 4/2015 |
| WO | WO 2016/129629 A1 | 8/2016 |
| WO | 2020/137296 A1 | 7/2020 |

OTHER PUBLICATIONS

Notice of Allowance for U.S. Appl. No. 17/102,412 dated Jul. 13, 2022, 5 pages.
Notice of Allowance for related U.S. Appl. No. 17/102,412, dated Mar. 24, 2022 (5 pages).
U.S. Office Action dated Oct. 20, 2021, issued in U.S. Appl. No. 17/073,124 (7 pages).
EPO Extended European Search Report dated Oct. 15, 2021, issued in corresponding European Patent Application No. 21170242.8 (10 pages).
Final Office Action for U.S. Appl. No. 17/102,332 dated Apr. 11, 2022, 7 pages.
Notice of Allowance for U.S. Appl. No. 17/073,124 dated Apr. 8, 2022, 5 pages.
Extended European Search Report dated Apr. 8, 2022 for European Patent Application No. 21206169.1, 9 pages.
Korean Office Action from Application No. 10-2020-0124255, dated Feb. 23, 2022, 7 pages.
U.S. Notice of Allowance from U.S. Appl. No. 17/073,124, dated Feb. 8, 2022, 8 pages.
Chinese Office Action, with English translation, dated Nov. 19, 2021, issued in Chinese Patent Application No. 201880077888.5 (22 pages).
U.S. Notice of Allowance dated Dec. 8, 2021, issued in U.S. Appl. No. 17/102,412 (10 pages).
U.S. Office Action dated Dec. 14, 2021, issued in U.S. Appl. No. 17/102,332 (9 pages).
Notice of Allowance for U.S. Appl. No. 17/073,124 dated Aug. 5, 2022, 5 pages.
Notice of Allowance for U.S. Appl. No. 17/102,332 dated Aug. 17, 2022, 8 pages.
Kim, Yongseon et al., First-principles and experimental investigation of the morphology of layer-structured $LiNiO_2$ and $LiCoO_2$, *Journal of Materials Chemistry*, 2012, vol. 22, pp. 12874-12881.

(56) References Cited

OTHER PUBLICATIONS

Korean Office Action dated May 21, 2020, for corresponding Korean Patent Application No. 10-2018-0153649 (6 pages).
Korean Intellectual Property Office Notice of Allowance for corresponding Korean Patent Application No. 10-2018-0153649, dated Sep. 22, 2020, 5 pages.
Duan, Jianguo et al., "Enhanced compacting density and cycling performance of Ni-riched electrode via building mono dispersed micron scaled morphology", *Journal of Alloys and Compounds*, vol. 695 (2017) pp. 91-99.
International Search Report and Written Opinion for patent application No. PCT/KR2018/015220, dated May 24, 2019, 10 pages.
Sun, Yang-Kook, et al., "Synthesis and Characterization of Li[(Ni0.8Co0.1Mn0.1)0.8(Ni0.5Mn0.5)0.2]O2 with the Microscale Core-Shell Structure as the Positive Electrode Material for Lithium Batteries," J. Am. Chem. Soc., vol. 127, 2005, 8 pages.
Li, Guangxin, et al, "Ultrathin Li—Si—O Coating Layer to Stabilize the Surface Structure and Prolong the Cycling Life of Single-Crystal LiNi0.6Co0.2Mn0.2O2 Cathode Materials at 4.5 V," ACS Applied Materials & Interfaces, vol. 13, Feb. 2021, pp. 10952-10963, XP055954371.
EPO Extended European Search Report dated Sep. 2, 2022, issued in European Patent Application No. 22165926.1 (10 pages).
EPO Extended European Search Report dated Jul. 23, 2021, issued in European Patent Application No. 18885458.2 (7 pages).
U.S. Notice of Allowance from U.S. Appl. No. 16/209,659, dated Jul. 17, 2020, 8 pages.
U.S. Restriction Requirement from U.S. Appl. No. 16/209,659, dated Mar. 27, 2020, 5 pages.
EPO Extended European Search Report dated Jan. 3, 2023, issued in European Patent Application No. 22189038.7 (9 pages).
Japanese Office Action dated Dec. 5, 2022, issued in Japanese Patent Application No. 2021-184817 (6 pages).
U.S. Notice of Allowance dated Feb. 1, 2023, issued in U.S. Appl. No. 17/073,124 (5 pages).
U.S. Notice of Allowance dated Feb. 1, 2023, issued in U.S. Appl. No. 17/102,332 (5 pages).

\* cited by examiner

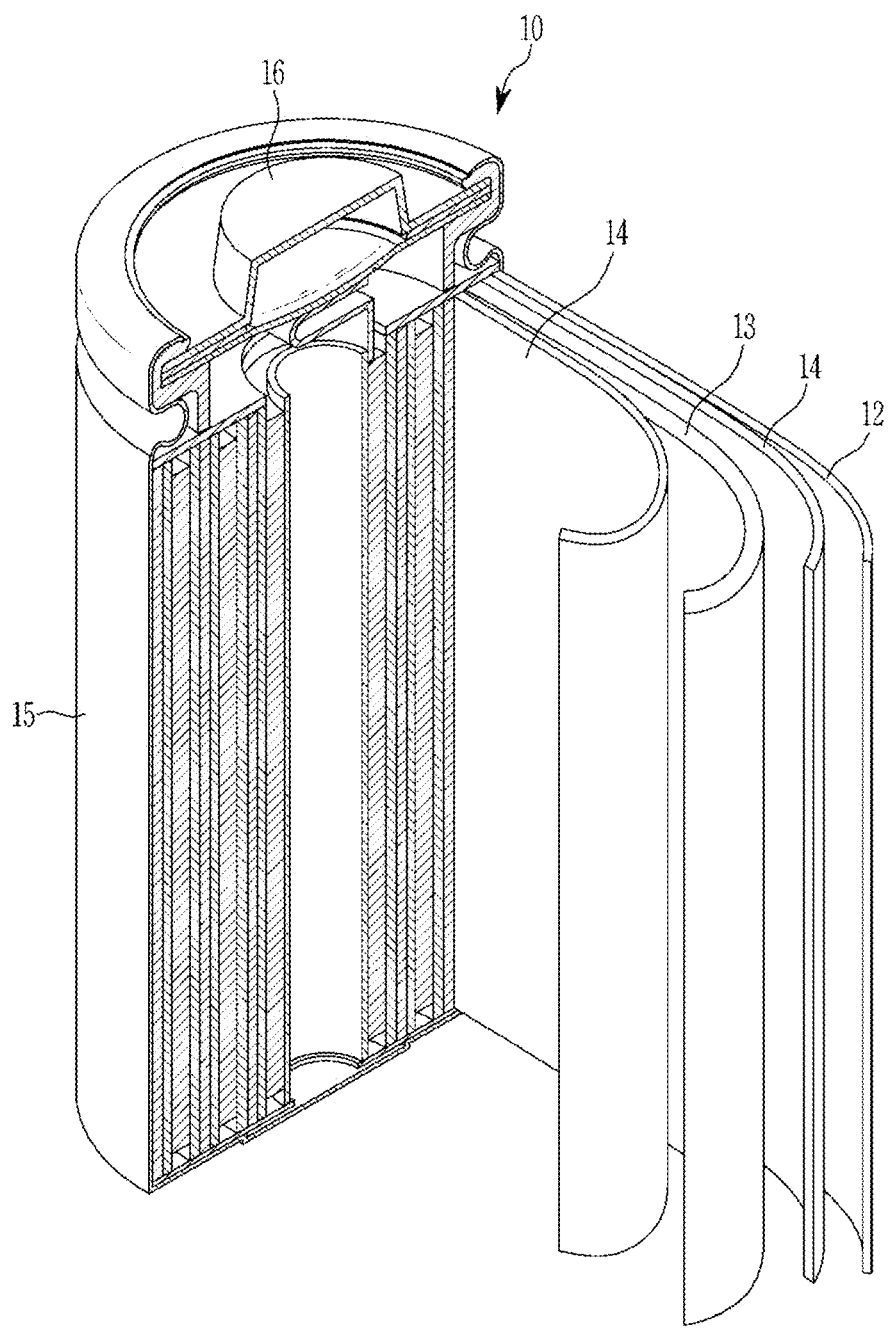
[FIG. 1]

[FIG. 2]
[FIG. 3]
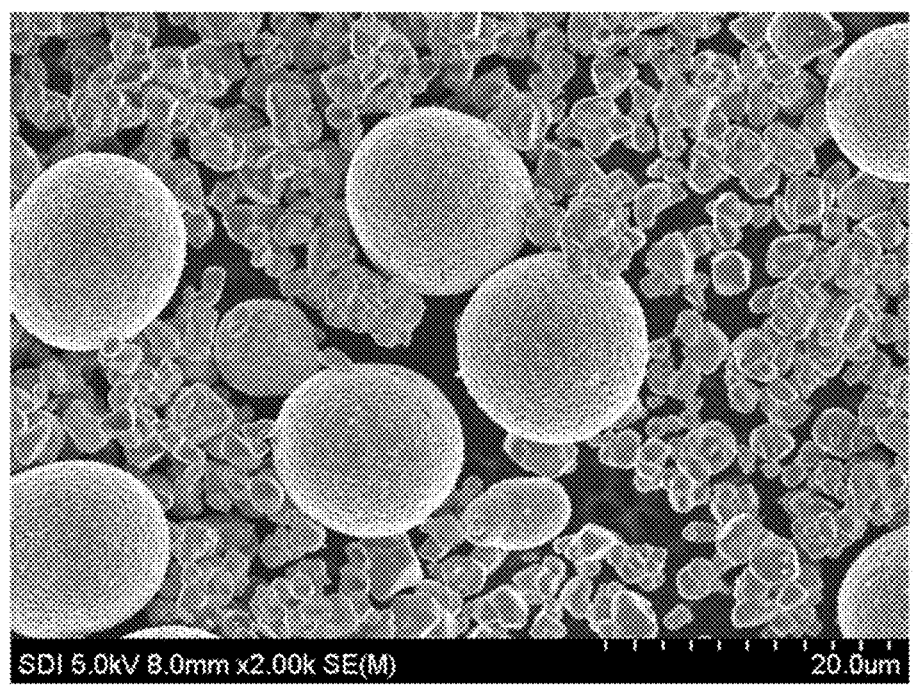

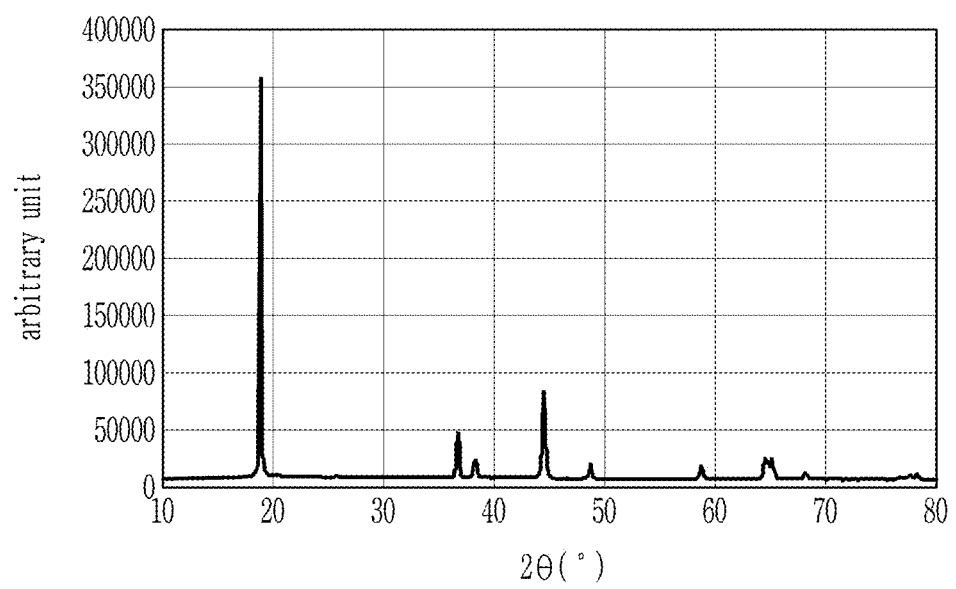
[FIG. 4]

POSITIVE ELECTRODE FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION

This application claims priority to and the benefit of Korean Patent Application No. 10-2020-0124255, filed in the Korean Intellectual Property Office on Sep. 24, 2020, the entire content of which is incorporated herein by reference.

BACKGROUND

1. Field

One or more aspects of embodiments of the present disclosure relate to a positive electrode for a rechargeable lithium battery, a method of preparing the same, and a rechargeable lithium battery including the same.

2. Description of the Related Art

Rechargeable lithium batteries are utilized in a variety of applications due to their high voltage and high energy density. For example, electric vehicles require rechargeable lithium batteries having improved discharge capacity and/or cycle-life characteristics because they can operate at high temperatures, can charge or discharge large amounts of electricity, and can be utilized for a long time.

Research is being actively conducted to increase capacity of a rechargeable lithium battery. However, additional research is needed to overcome a problem in which the cycle-life of the battery decreases when the capacity of the rechargeable lithium battery is increased.

As an example, nickel-based lithium metal oxides having suitable or excellent capacity characteristics are widely utilized as a positive active material for a rechargeable lithium battery. However, nickel-based lithium metal oxides have a problem in that battery characteristics such as charge/discharge efficiency and/or cycle-life are deteriorated due to side-reactions with the electrolyte, and thus improvement is desired.

SUMMARY

One or more aspects of embodiments of the present disclosure are directed toward a positive electrode for a rechargeable lithium battery with improved cycle-life characteristics, improved efficiency characteristics, and/or high temperature stability characteristics while still having high capacity, a method of preparing the same, and a rechargeable lithium battery including the same.

One or more embodiments of the present disclosure provide a positive electrode for a rechargeable lithium battery that includes a positive active material including: small particle diameter monolith particles having a particle diameter of about 1 μm to about 8 μm and including a (e.g., first) nickel-based lithium metal oxide, and large particle diameter secondary particles having a particle diameter of about 10 μm to about 20 μm and including a (e.g., second) nickel-based lithium metal oxide, wherein an X-ray diffraction peak intensity ratio (I(003)/I(104)) of the positive electrode is greater than or equal to about 3.

The X-ray diffraction peak intensity ratio (I(003)/I(104)) of the positive electrode for a rechargeable lithium battery may be greater than or equal to about 3.4.

The small particle diameter monolith particles and the large particle diameter secondary particles may be included in a weight ratio of about 10:90 to about 60:40.

The small particle diameter monolith particles may have a particle diameter of about 3 μm to about 6 μm.

The large particle diameter secondary particles may have a particle diameter of about 12 μm to about 20 μm.

The large particle diameter secondary particles may have a form in which two or more primary particles are aggregated, and the primary particles may have a particle diameter of several tens of nanometers to several hundred nanometers, for example, about 20 nm to about 500 nm.

The large particle diameter secondary particles may include about 90 mol % or more of nickel based on 100 mol % of the total amount of the transition metal.

The large particle diameter secondary particles may be a compound represented by Chemical Formula 1.

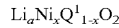   Chemical Formula 1

In Chemical Formula 1, 0.9≤a≤1.05, 0.9≤x≤0.98, and $Q^1$ may be at least one element selected from cobalt (Co), manganese (Mn), aluminum (Al), chromium (Cr), iron (Fe), calcium (Ca), boron (B), vanadium (V), magnesium (Mg), niobium (Nb), rubidium (Rb), molybdenum (Mo), tantalum (Ta), tungsten (W), copper (Cu), zinc (Zn), gallium (Ga), indium (In), lanthanum (La), cerium (Ce), praseodymium (Pr), tin (Sn), zirconium (Zr), tellurium (Te), ruthenium (Ru), titanium (Ti), lead (Pb), and hafnium (Hf).

The small particle diameter monolith particles may be a compound represented by Chemical Formula 2.

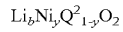   Chemical Formula 2

In Chemical Formula 2, 0.9≤b≤1.05, 0.3≤y≤0.98, and $Q^2$ may be at least one element selected from Co, Mn, Al, Cr, Fe, Ca, B, V, Mg, Nb, Rb, Mo, Ta, W, Cu, Zn, Ga, In, La, Ce, Pr, Sn, Zr, Te, Ru, Ti, Pb, and Hf.

The positive electrode for a rechargeable lithium battery may have a mixture density of greater than or equal to about 3.4 g/cc.

One or more embodiments of the present disclosure provide a rechargeable lithium battery including the positive electrode.

One or more embodiments of the present disclosure provide a method of preparing a positive electrode for a rechargeable lithium battery that includes: preparing a positive active material including small particle diameter monolith particles having a particle diameter of about 1 μm to about 8 μm and including a nickel-based lithium metal oxide, and large particle diameter secondary particles having a particle diameter of about 10 μm to about 20 μm and including a nickel-based lithium metal oxide; mixing the positive active material, a conductive agent, and a binder in a solvent to prepare a positive active material slurry; coating the positive active material slurry on a current collector and drying it to prepare a positive electrode; and compressing the positive electrode to have a density of greater than or equal to about 3.4 g/cc.

In the preparing method, the small particle diameter monolith particles and the large particle diameter secondary particles may be included in a weight ratio of about 10:90 to about 60:40.

The preparing of the positive active material slurry may be performed by mixing about 90 wt % to about 98 wt % of the positive active material, about 1 wt % to about 5 wt % of the conductive agent, and about 1 wt % to about 5 wt % of the binder.

The positive electrode for a rechargeable lithium battery according to an embodiment and a rechargeable lithium battery including the same may have a high capacity, and at the same time (e.g., concurrently) have suitable or excellent charge/discharge efficiency, suitable or excellent cycle-life, and/or high temperature stability.

BRIEF DESCRIPTION OF THE DRAWINGS

FIG. 1 is a perspective view schematically showing a typical structure of a rechargeable lithium battery according to an embodiment.

FIG. 2 is a scanning electron microscope (SEM) image of small particle diameter monolith particles according to Synthesis Example 2.

FIG. 3 is an SEM image of a positive active material in which the large particle diameter secondary particles and the small particle diameter monolith particles are mixed according to Example 1.

FIG. 4 is an X-ray diffraction (XRD) analysis graph of the positive electrode according to Example 1.

DETAILED DESCRIPTION

Hereinafter, a positive active material and a positive electrode according to embodiments, a method of preparing the same, and a rechargeable lithium battery including the same will be described in more detail. However, these embodiments are examples, the present disclosure is not limited thereto and the present disclosure is defined by the scope of claims.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

The "particle diameter" described in the present disclosure may be measured from an optical microscope image, and for example, the particle diameter of an active material may be measured by analyzing an scanning electron microscope (SEM) image of a cross section of the electrode plate.

According to an embodiment, a rechargeable lithium battery having a maximum or high capacity and improved cycle-life characteristics is provided. In general, the positive active material directly affects (e.g., determines) the cycle-life and capacity of a rechargeable lithium battery, but rechargeable lithium batteries have a problem that the cycle-life of the battery decreases as the capacity increases. In order to solve this problem, an embodiment provides a positive electrode for a rechargeable lithium battery that includes a positive active material including small particle diameter monolith particles having a particle diameter of about 1 μm to about 8 μm and including a nickel-based lithium metal oxide, and large particle diameter secondary particles having a particle diameter of about 10 μm to about 20 μm and including a nickel-based lithium metal oxide, wherein an X-ray diffraction peak intensity ratio (I(003)/I(104)) of the positive electrode is greater than or equal to about 3, which may provide improved cycle-life while maximizing the capacity of the rechargeable lithium battery.

The positive electrode for a rechargeable lithium battery according to the present embodiment has an X-ray diffraction (XRD) peak intensity ratio (I(003)/I(104)) (e.g., a peak intensity of a (003) plane to a peak intensity of the (104) plane) of greater than or equal to about 3. The term "diffraction peak intensity" herein refers to an intensity at the maximum value (maximum height) of a diffraction peak shown in the XRD analysis graph. The X-ray diffraction peak intensity ratio of the (003) plane to the (104) plane may be obtained from XRD analysis of the positive electrode plate (e.g., not from the positive active material). The term "(003) plane" refers to the lattice plane corresponding to Miller index (003), and the term "(104) plane" refers to the lattice plane corresponding to Miller index (104).

The positive electrode for a rechargeable lithium battery includes a positive active material including small particle diameter monolith particles having a particle diameter of about 1 μm to about 8 μm and including a nickel-based lithium metal oxide, and large particle diameter secondary particles having a particle diameter of about 10 μm to about 20 μm and including a nickel-based lithium metal oxide, and accordingly in the process of rolling (e.g., preparing) the electrode plate, the (003) plane becomes oriented (e.g., crystals of the nickel-based lithium metal oxide may be preferentially or anisotropically oriented so that the (003) planes in the crystals may be at least partially aligned within the electrode), and as a result, the (003) peak appears larger (e.g., may have higher intensity compared to an isotropically oriented mixture) when the XRD measurement of the electrode plate is performed. Accordingly, in the positive electrode for a rechargeable lithium battery according to an embodiment, the X-ray diffraction peak intensity ratio (I(003)/I(104)) of the (003) plane to the (104) plane may be greater than or equal to about 3.

When the X-ray diffraction peak intensity ratio (I(003)/I(104)) is less than about 3, it may be difficult or impossible to obtain a rechargeable lithium battery that achieves a target maximum capacity and at the same time (e.g., concurrently) secures excellent cycle-life characteristics, and further, intercalation and deintercalation of lithium in the positive electrode may not be performed smoothly, and/or power characteristics may be lowered. The X-ray diffraction peak intensity ratio (I(003)/I(104)) of the positive electrode for a rechargeable lithium battery may be, for example, greater than or equal to about 3.1, greater than or equal to about 3.2, greater than or equal to about 3.3, greater than or equal to about 3.4, or greater than or equal to about 3.5. When the diffraction peak intensity ratio satisfies the above range, the positive electrode and the rechargeable lithium battery including the same can achieve high capacity and at the same time secure suitable or excellent cycle-life, suitable or excellent efficiency, and/or high temperature stability.

The positive active material included in the positive electrode of an embodiment includes two types (kinds) of particles, wherein the first is small particle diameter monolith particles having a particle diameter of about 1 μm to about 8 μm and including a nickel-based lithium metal oxide, and the second is large particle diameter secondary particles having a particle diameter of about 10 μm to about 20 μm and including a nickel-based lithium metal oxide.

The small particle diameter monolith particles are in the form of a single particle rather than a form in which a plurality of particles are aggregated (e.g., are primary particles). The term "monolith structure" refers to a structure in which a morphology of each particle is separated and/or dispersed in independent phases separated from each other (e.g., the particles are not aggregated or agglomerated).

On the other hand, the large particle diameter secondary particles do not exist in the form of a monolith particle, and have a form of secondary particles, in which at least two or more primary particles are aggregated. One large particle diameter secondary particle may be formed by gathering (e.g., may be formed from) tens to hundreds of primary particles, for example, about 10 to about 200 primary particles. The primary particles may have a crystal size of several tens of nanometers to several hundred nanometers, and for example, the primary particles may have a particle diameter of about 20 nm to about 500 nm.

According to an embodiment, by adjusting the particle diameters of the small particle diameter monolith particles and large particle diameter secondary particles included in the positive active material, high capacity and excellent cycle-life characteristics may be achieved, a gas generation amount may be reduced at a high voltage, and reliability and safety may be ensured when implementing a rechargeable lithium battery utilizing the same.

The small particle diameter monolith particles may have a particle diameter of about 1 μm to about 8 μm, for example, greater than or equal to about 1 μm, greater than or equal to about 1.5 μm, greater than or equal to about 2 μm, greater than or equal to about 2.5 μm, greater than or equal to about 3 μm, greater than or equal to about 3.5 μm, or greater than or equal to about 4 μm, and less than or equal to about 8 μm, less than or equal to about 7.5 μm, less than or equal to about 7 μm, less than or equal to about 6.5 μm, less than or equal to about 6 μm, less than or equal to about 5.5 μm, less than or equal to about 5 μm, or less than or equal to about 4.5 μm. For example, the small particle diameter monolith particles may have a particle diameter of 2 μm to about 7 μm, about 3 μm to about 6 μm, or about 3 μm to about 5 μm. When the particle diameter of the small particle diameter monolith particles is less than about 1 μm, as the surface area in contact with the electrolyte increases, a film formed on the surface may be excessively formed, thereby increasing the possibility of an increase in irreversible capacity and/or side-reaction(s), while when the particle diameter is more than about 8 μm, transfer rates of lithium ions in the crystal grains may decrease, resulting in decreased output characteristics.

The large particle diameter secondary particles may have a particle diameter of about 10 μm to about 20 μm, for example greater than or equal to about 10 μm, greater than or equal to about 11 μm, greater than or equal to about 12 μm, greater than or equal to about 13 μm, greater than or equal to about 14 μm, or greater than or equal to about 15 μm, and less than or equal to about 20 μm, less than or equal to about 19 μm, less than or equal to about 18 μm, less than or equal to about 17 μm, or less than or equal to about 16 μm. When the particle diameter of the large particle diameter secondary particles is less than about 10 μm, a mixture density of the electrode plate may decrease, while when it exceeds about 20 μm, a mixture density of the electrode plate may decrease and/or high rate characteristics may be deteriorated.

The positive active material according to an embodiment concurrently (e.g., simultaneously) includes small particle diameter monolith particles and large particle diameter secondary particles respectively having the particle diameter ranges, and may thus: i) improve the cycle-life characteristics of a rechargeable lithium battery by reducing a specific surface area and removing residual lithium to thereby suppress surface side-reactions between the residual lithium and an electrolyte solution, and ii) secure stability of the rechargeable lithium battery at a high voltage by improving crystallinity.

In an embodiment, the small particle diameter monolith particles and the large particle diameter secondary particles may be included in a weight ratio of about 10:90 to about 60:40, for example about 10:90 to about 50:50, about 10:90 to about 40:60, about 10:90 to about 30:70, or about 15:85 to about 25:75. When the ranges are satisfied, a diffraction peak intensity ratio (I(003)/I(104)) of the (003) plane and the (104) plane of X-ray diffraction with a respect to a positive electrode may be greater than or equal to about 3, and as a result, a rechargeable lithium battery having high capacity characteristics and also, improved cycle-life characteristics may be obtained.

In an embodiment, the small particle diameter monolith particles may be included in an amount of about 10 wt % to about 60 wt %, for example, about 10 wt % to about 50 wt %, about 10 wt % to about 40 wt %, about 10 wt % to about 30 wt %, or about 15 wt % to about 60 wt % based on 100 wt % of the total weight of the positive active material. The large particle diameter secondary particles may be included in an amount of about 40 wt % to about 90 wt %, for example, about 50 wt % to about 90 wt %, about 60 wt % to about 90 wt %, about 70 wt % to about 90 wt %, about 50 wt % to about 90 wt %, or about 40 wt % to about 85 wt % based on 100 wt % of the total weight of the positive active material. When the ranges are satisfied, a rechargeable lithium battery including these may concurrently (e.g., simultaneously) realize high capacity, cycle-life characteristics, and/or the like.

In some embodiments, the large particle diameter secondary particles may include or be formed of high nickel-based lithium metal oxide, for example, a compound (i.e., a "high" nickel-based lithium metal oxide) including greater than or equal to about 90 mol % of nickel based on 100 mol % of the total amount of the transition metal. Herein, a rechargeable lithium battery including the same may realize high capacity and concurrently (e.g., simultaneously) exhibit excellent characteristics.

In general, a positive electrode manufactured by applying the high nickel-based positive active material may hardly accomplish an X-ray diffraction peak intensity ratio (I(003)/I(104)) of greater than or equal to about 3. However, according to an embodiment, even when the large particle diameter secondary particles are a high nickel-based compound, the X-ray diffraction peak intensity ratio of the (003) plane to the (104) plane may be secured to be greater than or equal to about 3, and accordingly, cycle-life characteristics, high temperature safety, and/or the like may be concurrently (e.g., simultaneously) realized, while the capacity of the rechargeable lithium battery is increased.

For example, the large particle diameter secondary particles may include or be formed of a compound represented by Chemical Formula 1:

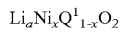    Chemical Formula 1

In Chemical Formula 1, $0.9 \leq a \leq 1.05$, $0.9 \leq x \leq 0.98$, and $Q^2$ is at least one an element selected from cobalt (Co), manganese (Mn), aluminum (Al), chromium (Cr), iron (Fe), calcium (Ca), boron (B), vanadium (V), magnesium (Mg), niobium (Nb), rubidium (Rb), molybdenum (Mo), tantalum (Ta), tungsten (W), copper (Cu), zinc (Zn), gallium (Ga), indium (In), lanthanum (La), cerium (Ce), praseodymium (Pr), tin (Sn), zirconium (Zr), tellurium (Te), ruthenium (Ru), titanium (Ti), lead (Pb), and hafnium (Hf).

In some embodiments, the small particle diameter monolith particles may include or be formed of a nickel-based lithium metal oxide and may be a compound including about 30 mol % or more of nickel, for example, a compound including about 40 mol % or more, about 50 mol % or more, about 60 mol % or more, about 70 mol % or more, about 80 mol % or more, or about 90 mol % or more of nickel, based on 100 mol % of the total amount of the transition metal.

In an embodiment, when the large particle diameter secondary particles and the small particle diameter monolith particles are all high nickel-based compounds, the X-ray diffraction peak intensity ratio of the (003) plane and the (104) plane may be greater than or equal to about 3, and accordingly, cycle-life characteristics, high temperature safety, and/or the like may be secured, while capacity of the rechargeable lithium battery is increased.

For example, the small particle diameter monolith particles may be a compound represented by Chemical Formula 2:

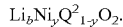    Chemical Formula 2

In Chemical Formula 2, $0.9 \leq b \leq 1.05$, $0.3 \leq y \leq 0.98$, and $Q^2$ is at least one element selected from Co, Mn, Al, Cr, Fe, Ca, B, V, Mg, Nb, Rb, Mo, Ta, W, Cu, Zn, Ga, In, La, Ce, Pr, Sn, Zr, Te, Ru, Ti, Pb, and Hf.

In Chemical Formula 2, y denoting a nickel content may be, for example, in a range of about $0.4 \leq y \leq 0.98$, about $0.5 \leq y \leq 0.98$, about $0.6 \leq y \leq 0.98$, about $0.7 \leq y \leq 0.98$, about $0.8 \leq y \leq 0.98$, or about $0.9 \leq y \leq 0.98$.

In an embodiment, the positive electrode manufactured by utilizing the large particle diameter secondary particles and the small particle diameter monolith particles may have mixture density of greater than or equal to about 3.4 g/cc. The mixture density may be understood as (e.g., may refer to) compression density when an electrode plate is manufactured. When the mixture density is greater than or equal to about 3.4 g/cc, the X-ray diffraction peak intensity ratio of the (003) plane to the (104) plane to the positive electrode may be secured to be greater than or equal to about 3, and accordingly, battery safety and/or excellent cycle-life characteristics may be realized, and in addition, capacity per battery volume may be increased, thereby providing a high-capacity rechargeable lithium battery. In some embodiments, when the mixture density is within the range, a positive electrode having excellent discharge capacity may be obtained by preventing or reducing problems (such as insufficient impregnation of the electrolyte solution, deterioration of high rate characteristics, crushing of the active material particles, breakage of a current collector during the process, and/or the like).

In some embodiments, in the positive active material, a ratio of nickel ions occupying lithium sites (a cation mixing ratio) may be greater than or equal to about 2.0 atom %, for example, about 0.0001 atom % to about 0.3 atom %. The term "cation mixing" refers to mixing of nickel ions into lithium ion sites via diffusion during the high temperature firing process, for example due to nickel ions ($Ni^{2+}$ ions) having almost the same particle radius as lithium ions ($Li^+$ ions). When $Ni^{2+}$ ions are mixed into the lithium sites, the region may be regarded as a locally irregularly-arranged rock salt layer that is not only electrochemically inert but also prohibits or reduces solid-phase diffusion of the lithium ions in the lithium layer, and thus suppresses the battery reaction. The positive active material according to an embodiment is suppressed from this cation mixing (e.g., is subject to reduced cation mixing), and may thus provide improve battery characteristics.

In the positive active material according to an embodiment, a content of the residual lithium may be less than or equal to about 0.1 wt %. For example, a content of LiOH may be in a range of about 0.01 wt % to about 0.06 wt %, and a content of $Li_2CO_3$ may be in a range of about 0.05 wt % to about 0.1 wt %. Herein, the contents of LiOH and $Li_2CO_3$ may each be measured in a titration method. In the positive active material, a content of $Li_2CO_3$ as analyzed by GC-MS may be in a range of about 0.01 wt % to about 0.05 wt %. In this way, when the residual lithium content is small, side-reaction(s) of the residual lithium with an electrolyte solution may be suppressed, and gas generation at a high voltage and a high temperature may be suppressed, and accordingly, the positive active material may exhibit excellent safety. In some embodiments, when the content of LiOH is small, the pH of the positive electrode slurry may be decreased during the manufacturing process, and accordingly, the positive electrode slurry may be stable and thus accomplish substantially uniform electrode plate coating. This LiOH decrease may secure slurry stability during the slurry manufacturing process for the positive electrode plate coating.

Because the positive electrode having the aforementioned configuration may suppress side-reaction(s) of the nickel-based lithium metal oxide with an electrolyte solution, the thermal stability and/or structural stability of the nickel-based lithium metal oxide may be improved, and thus stability and charge and discharge characteristics of a rechargeable lithium battery including the positive active material may be improved.

Another embodiment provides a method of preparing a positive electrode for a rechargeable lithium battery. The method of preparing the positive electrode includes preparing a positive active material including a small particle diameter monolith particles having a particle diameter of about 1 μm to about 8 μm as a nickel-based lithium metal oxide, and a large particle diameter secondary particles having a particle diameter of about 10 μm to about 20 μm as a nickel-based lithium metal oxide, mixing the positive active material, a conductive agent, and a binder in a solvent to prepare a positive active material slurry, coating the positive active material slurry on a current collector and drying it to prepare a positive electrode, and compressing the positive electrode to have a density of greater than or equal to about 3.4 g/cc.

Herein, the positive active material is substantially the same as described.

In the positive active material, the small particle diameter monolith particles and the large particle diameter secondary particles may be included in a weight ratio of about 10:90 to about 60:40, for example about 10:90 to about 50:50, about 10:90 to about 40:60, about 10:90 to about 30:70, or about 15:85 to about 25:75. When the above range is satisfied, the X-ray diffraction peak intensity ratio (I(003)/I(104)) of the positive electrode may advantageously have a value of greater than or equal to about 3, and as a result, a rechargeable lithium battery having high capacity characteristics and improved cycle-life characteristics may be obtained.

The preparing of the positive active material slurry may be, for example, performed by mixing about 90 wt % to about 98 wt % of the positive active material, about 1 wt % to about 5 wt % of the conductive agent, and about 1 wt % to about 5 wt % of the binder.

The binder is a component that aids in bonding of an active material and a conductive agent and/or bonding to a current collector, and may be added in an amount of about 1 wt % to about 5 wt % based on a total weight of the positive active material slurry. When the content of the binder is within the above range, the binding strength of the active material layer to the current collector may be suitable or good. Non-limiting examples of the binder may include polyvinylidene fluoride, polyvinyl alcohol, carboxymethyl cellulose (CMC), starch, hydroxypropylcellulose, recycled cellulose, polyvinylpyrrolidone, polytetrafluoroethylene, polyethylene, polypropylene, an ethylene-propylene-diene rubber (EPDM), sulfonated EPDM, a styrene butadiene rubber, a fluorine rubber, and/or various suitable copolymers.

The conductive agent is not particularly limited as long as it does not cause an unwanted chemical change of a battery and has conductivity, and may be or include, for example, graphite (such as natural graphite and/or artificial graphite); a carbon-based material (such as carbon black, acetylene black, ketjen black, channel black, furnace black, lamp black, summer black and/or the like); a conductive fiber (such as a carbon fiber and/or a metal fiber), and/or the like; carbon fluoride; a metal powder (such as an aluminum and/or nickel powder); zinc oxide; a conductive whisker (such as potassium titanate), and/or the like; a conductive metal oxide (such as a titanium oxide); a conductive material (such as a polyphenylene derivative); and/or the like.

The content of the conductive agent may be about 1 wt % to about 5 wt % based on the total weight of the positive active material slurry. When the content of the conductive agent is within the above range, the finally obtained electrode has excellent conductivity characteristics.

Non-limiting examples of the solvent may be N-methyl pyrrolidone, and/or the like. The solvent may be utilized in an amount of about 10 parts by weight to about 200 parts by weight based on 100 parts by weight of the positive active material.

When the content of the solvent is within the above range, the work for forming the active material layer may become easy.

The positive current collector may have a thickness of about 3 μm to about 50 μm, is not particularly limited as long as it does not cause an unwanted chemical change in the battery and has high conductivity, and may be, for example, stainless steel, aluminum, nickel, titanium, heat-treated carbon, or aluminum or stainless steel that has been surface-treated with carbon, nickel, titanium, and/or silver. The current collector may have fine irregularities formed on a surface thereof to increase the adhesive force of the positive active material, and may have or be in various suitable forms (such as a film, a sheet, a foil, a net, a porous body, foam, and/or a non-woven fabric body).

In the method of preparing the positive electrode, the compression density of the positive electrode may be greater than or equal to about 3.4 g/cc, for example, greater than or equal to about 3.43 g/cc, or greater than or equal to about 3.45 g/cc. When the compression density satisfies the ranges, the X-ray diffraction peak intensity ratio of the (003) plane and the (104) plane to the positive electrode may be secured to be greater than or equal to about 3, and may provide excellent cycle-life characteristics and/or safety characteristics. In some embodiments, capacity per battery volume may be increased, providing a high-capacity rechargeable lithium battery, and/or a battery with high charge and discharge efficiency may be obtained by preventing or reducing problems (such as insufficient impregnation of an electrolyte solution, deterioration of high rate capability, crushing of the active material particles, breakage of a current collector during processing, and/or the like).

Another embodiment provides a rechargeable lithium battery including the aforementioned positive electrode. Hereinafter, a rechargeable lithium battery including the positive electrode and the negative electrode, a lithium salt-containing non-aqueous electrolyte, and a separator is described.

The negative electrode may be prepared by mixing a negative active material, a binder, a thickener, a conductive agent, a solvent, etc. to prepare a negative active material slurry, coating the negative active material slurry on a current collector, and drying to prepare a negative electrode, and compressing the negative electrode.

A material capable of intercalating and deintercalating lithium ions is utilized as the negative active material. As a non-limiting example of the negative active material, a carbon-based material (such as graphite, lithium metal and/or an alloy thereof), and/or a silicon oxide-based material may be utilized. According to an embodiment, graphite may be utilized as a negative active material.

The binder may be added in an amount of about 1 wt % to about 5 wt % based on a total weight of the negative active material slurry. Non-limiting examples of such a binder may include those applied to the positive electrode.

The thickener may be utilized in an amount of about 1 wt % to about 5 wt % based on a total weight of the negative active material slurry. When the content of the thickener is within the above range, the finally obtained electrode has excellent adhesive strength. The material of the negative active material is generally a conductive material, and a conductive agent is not required in many cases, but may be added in some cases. The content of the solvent may be about 10 parts by weight to 300 parts by weight based on a total of 100 parts by weight of the negative active material. When the content of the solvent is within the range, the work for forming the active material layer may become easy. Non-limiting examples of the conductive agent and solvent may be substantially the same as those applied to the positive electrode.

The negative current collector may have a thickness of about 3 μm to about 50 μm. Such a negative current collector is not particularly limited as long as it does not cause a chemical change in the battery and has high conductivity, and may be for example, copper, stainless steel, aluminum, nickel, titanium, heat-treated carbon, copper, and/or stainless steel surface-treated with carbon, nickel, titanium, and/ or silver, an aluminum-cadmium alloy, and/or the like. In some embodiments, the negative current collector may have fine irregularities formed on a surface thereof to increase the adhesive force of the negative active materials, and be provided in various suitable forms (such as a film, a sheet, a foil, a net, a porous body, foam, and/or a non-woven fabric body), similar to the positive current collector.

A separator may be disposed between the positive electrode and the negative electrode prepared according to the above processes. The separator may generally have a pore diameter of about 0.01 μm to about 10 μm, and a thickness of about 5 μm to about 30 μm. Non-limiting examples of the separator may be an olefin-based polymer (such as polypropylene, polyethylene, and/or the like); and/or a sheet or a nonwoven fabric formed of a glass fiber. In the case that a solid electrolyte such as a polymer is utilized as the electrolyte, the solid electrolyte may also serve as the separator.

A lithium salt-containing non-aqueous electrolyte may be composed of a non-aqueous electrolyte and a lithium salt. The non-aqueous electrolyte may be a non-aqueous electrolyte, an organic solid electrolyte, or inorganic solid electrolyte.

The non-aqueous electrolyte may be or include, for example, aprotic organic solvents such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, N,N-formamide, N,N-dimethyl formamide, acetonitrile, nitromethane, methyl formate, methyl acetate, trimethoxymethane, dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like.

The organic solid electrolyte may be or include, for example, a polyethylene derivative, a polyethylene oxide derivative, a polypropylene oxide derivative, a phosphoric acid ester polymer, polyvinyl alcohol, polyvinylidene fluoride, and/or the like.

The inorganic solid electrolyte may be or include, for example, $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, and/or the like.

The lithium salt may be a material that is readily soluble in the non-aqueous electrolyte, and may be or include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, $(FSO_2)_2NLi$, $(FSO_2)_2NLi$, lithium chloroborate, lower aliphatic lithium carbonate, tetraphenyl lithium borate, and/or the like.

FIG. 1 is a perspective view schematically showing a representative structure of a rechargeable lithium battery according to an embodiment. Referring to FIG. 1, a rechargeable lithium battery 10 includes a positive electrode 13, a negative electrode 12, a separator 14 between the positive electrode 13 and the negative electrode 12, an electrolyte (impregnated in the positive electrode 13, the negative electrode 12, and the separator 14), a battery case 15, and a cap assembly 16 sealing the battery case 15. The rechargeable lithium battery 10 may be manufactured by sequentially stacking and spiral-winding the positive electrode 13, the negative electrode 12, and the separator 14, and housing the wound product in the battery case 15. The battery case 15 is sealed with the cap assembly 16 to complete the rechargeable lithium battery 10.

The rechargeable lithium battery may be included in a battery cell utilized as a power source for small devices due to improved power output characteristics, as well as in a medium/large battery pack or a battery module including a plurality of battery cells utilized as a power source for medium/large devices.

Non-limiting examples of the medium/large devices may include electric vehicles including electric vehicles (EVs), hybrid electric vehicles (HEVs), plug-in hybrid electric vehicles (PHEVs), and the like, electric motorcycle power tools including electric bicycles (E-bikes), electric scooters (E-scooters), and/or the like, but is not limited thereto.

Hereinafter, embodiments are illustrated in more detail with reference to examples. These examples, however, are not in any sense to be interpreted as limiting the scope of the disclosure.

Synthesis Example: Preparation of Positive Active Material

Synthesis Example 1: Preparation of NCA Large Particle Diameter Secondary Particles After putting 10 L of distilled water in a co-precipitation reactor (20 L), $N_2$ gas was supplied into the reactor at 6 L/min, and the reactor was stirred at 400 rpm, while being maintained at 40° C. A nickel precursor of $NiSO_4(H_2O)_6$, a cobalt precursor of $CoSO_4(H_2O)_7$, and an aluminum precursor of $Al_2(SO_4)_3(H_2O)_{18}$ at a mole ratio of 94:5:1 were added to the water to prepare a nickel cobalt aluminum hydroxide precursor aqueous solution at a concentration of 2 M. Herein, a nickel cobalt solution at 0.6 L/hour, an ammonia ($NH_4OH$) solution at a concentration of 16 M at 0.08 L/hour, and an aluminum solution at 0.02 L/hour were respectively consecutively put in the reactor. While pH in the reactor was checked to maintain the pH within a range of 11 to 13, a NaOH solution at a concentration of 4 M was added thereto and then, reacted for 40 hours to precipitate nickel cobalt aluminum hydroxide, $Ni_{0.94}Co_{0.05}Al_{0.01}(OH)_2$. The precipitate was filtered, washed, and dried at 120° C. under a vacuum condition for 12 hours to prepare $Ni_{0.94}Co_{0.05}Al_{0.01}(OH)_2$ powder.

Subsequently, $LiOH·H_2O$ was added thereto to provide a mole ratio of 1.02:1 between the lithium and transition metal. The prepared precursors were mixed, heat-treated at 720° C. for 10 hours under an oxygen atmosphere with greater than or equal to 80% of oxygen in a furnace, washed to remove lithium remaining on the surface, and heat-treated at 700° C. for 10 hours to prepare a positive active material.

The obtained positive active material was $Li[Ni_{0.94}Co_{0.05}Al_{0.01}]O_2$, and according to SEM image analysis, the positive active material included secondary particles having a large particle diameter of about 18 μm, which included or consisted of primary particles having a size of 100 nm to 200 nm.

Synthesis Example 2: Preparation of NCA Small Particle Diameter Monolith Particles A positive active material was prepared utilizing a method of changing the co-precipitation reaction into 4 hours instead of 40 hours, setting the firing condition at 920° C. instead of 720° C., and performing the heat treatment at 850° C. for 10 hours after the grinding in Synthesis Example 1. The obtained positive active material was $Li[Ni_{0.94}Co_{0.05}Al_{0.01}]O_2$, and according to SEM image analysis (as shown in FIG. 2), included monolith particles with a particle diameter of about 4 μm. The SEM image analysis was performed by utilizing a s4800 made by Hitachi Ltd.

Synthesis Example 3: Preparation of NCA Small Particle Diameter Monolith Particles A nickel cobalt manganese hydroxide precursor aqueous solution was prepared by adding a nickel precursor of $NiSO_4(H_2O)_6$, a cobalt precursor of $CoSO_4(H_2O)_7$, and a manganese precursor of $MnSO_4(H_2O)$ in a mole ratio of 94:5:1 in water. Herein, the nickel precursor, cobalt precursor, and manganese precursor aqueous solution was stirred, and an ammonia solution was additionally continuously put therein at a concentration of 14 M at 0.08 L/hour.

Subsequently, a sodium hydroxide aqueous solution was slowly added thereto with stirring to neutralize the precursor aqueous solution and thus precipitate a nickel cobalt manganese hydroxide of $Ni_{0.94}Co_{0.05}Mn_{0.01}(OH)_2$. This precipitate was filtered, washed, and dried at 120° C. under a vacuum condition to prepare $Ni_{0.94}Co_{0.05}Mn_{0.01}O_2(OH)_2$ powder.

$LiOH \cdot H_2O$ was added thereto to have a mole ratio of 1.00:1.00 between lithium and transition metal. The prepared precursors were mixed and heat-treated in a furnace at 920° C. for 10 hours, while flowing $O_2$, to prepare a positive active material. The obtained positive active material was $Li[Ni_{0.94}Co_{0.05}Mn_{0.01}]O_2$ and according to SEM image analysis, included monolith particles with a particle diameter of about 4 μm.

Comparative Synthesis Example 1: Preparation of NCA Small Particle Diameter Secondary Particles A positive active material was prepared according to substantially the same method as Synthesis Example 1, except that the co-precipitation reaction time was changed into 4 hours instead of 40 hours. The obtained positive active material was $Li[Ni_{0.94}Co_{0.05}Al_{0.01}]O_2$ and according to SEM image analysis, included secondary particles including (e.g., consisting of) primary particles with a size of 100 nm to 200 nm and having a particle diameter of about 4 μm.

Examples and Comparative Examples: Preparation of Positive Electrode and Rechargeable Lithium Battery Cells

Example 1

A positive active material was prepared by mixing the large particle diameter secondary particles of Synthesis Example 1 and the small particle diameter monolith particles of Synthesis Example 2 in a weight ratio of 80:20. FIG. 3 is an SEM image of the resulting positive active material. 96 wt % of the positive active material, 2 wt % of denka black, and 2 wt % of polyvinylidene fluoride were mixed in an N-methyl pyrrolidone solvent to prepare positive active material slurry. The slurry was coated with a load level of 45 mg/cm² on a 12 μm-thick aluminum current collector, dried at 120° C. for 1 hour, compressed to have a density of 3.49 g/cc, thereby manufacturing a 132 μm-thick positive electrode for a rechargeable lithium battery.

The positive electrode and a lithium metal negative electrode were utilized to manufacture a coin cell. An about 20 μm-thick separator formed of a porous polyethylene film was interposed between the positive electrode and the lithium metal counter electrode, and an electrolyte was injected thereinto, thereby manufacturing a coin cell. The electrolyte was prepared by mixing ethylene carbonate (EC), ethylmethyl carbonate (EMC), and dimethyl carbonate (DMC) in a volume ratio of 3:3:4 and dissolving 1.15 M $LiPF_6$ therein.

Example 2

A positive electrode and a rechargeable lithium battery cell were manufactured according to substantially the same method as Example 1, except that the electrode plate was compressed to have a density of 3.65 g/cc instead of 3.49 g/cc.

Example 3

A positive electrode and a rechargeable lithium battery cell were manufactured according to substantially the same method as Example 1, except that the small particle diameter monolith particles of Synthesis Example 3 were utilized instead of the small particle diameter monolith particles of Synthesis Example 2, and the electrode plate was compressed to have a density of 3.65 g/cc.

Comparative Example 1

A positive electrode and a rechargeable lithium battery cell were manufactured according to substantially the same method as Example 1, except that the electrode plate was compressed to have a density of 3.23 g/cc instead of the electrode plate compression density of 3.49 g/cc.

Comparative Example 2

A positive electrode and a rechargeable lithium battery cell were manufactured according to substantially the same method as Example 1, except that the electrode plate was compressed to have a density of 3.35 g/cc instead of the electrode plate compression density of 3.49 g/cc.

Comparative Example 3

A positive electrode and a rechargeable lithium battery cell were manufactured according to substantially the same method as Example 1, except that the small particle diameter secondary particles of Comparative Synthesis Example 1 were utilized instead of the small particle diameter monolith particles of Synthesis Example 2, and the electrode plate was compressed to have a density of 3.65 g/cc.

Comparative Example 4

A positive electrode and a rechargeable lithium battery cell were manufactured according to substantially the same method as Example 1, except that the small particle diameter monolith particles of Comparative Synthesis Example 2 were utilized instead of the large particle diameter secondary particles, and the electrode plate was compressed to have a density of 3.35 g/cc.

Comparative Example 5

A positive electrode and a rechargeable lithium battery cell were manufactured according to substantially the same method as Example 1, except that the small particle diameter monolith particles of Synthesis Example 2 were utilized instead of the large particle diameter secondary particles, and the electrode plate was compressed to have a density of 3.49 g/cc.

The design details of Examples 1 to 3 and Comparative Examples 1 to 5 are summarized in Table 1.

TABLE 1

|  | Large particle diameter secondary particles | Small particle diameter monolith particles | Electrode density (g/cc) |
|---|---|---|---|
| Example 1 | Synthesis Example 1 | Synthesis Example 2 | 3.49 |
| Example 2 | Synthesis Example 1 | Synthesis Example 2 | 3.65 |
| Example 3 | Synthesis Example 1 | Synthesis Example 3 | 3.65 |
| Comparative Example 1 | Synthesis Example 1 | Synthesis Example 2 | 3.23 |
| Comparative Example 2 | Synthesis Example 1 | Synthesis Example 2 | 3.35 |
| Comparative Example 3 | Synthesis Example 1 | Comparative Synthesis Example 1 | 3.65 |
| Comparative Example 4 | — | Synthesis Example 2 | 3.35 |
| Comparative Example 5 | — | Synthesis Example 2 | 3.49 |

Evaluation Example 1: XRD Analysis of Positive Electrode

The positive electrodes according to Examples 1 to 3 and Comparative Examples 1 to 3 were analyzed through XRD. The XRD analysis was performed by utilizing an X'pert made by Phillips, and X-ray diffraction peak intensity on the (003) plane and the (104) plane and an intensity ratio of (I(003)/I(104)) are shown in Table 2. An XRD analysis graph of the positive electrode according to Example 1 is shown in FIG. 4. In the XRD analysis, CuK-alpha (wavelength 1.5405980 Å) is utilized as an excitation source.

TABLE 2

|  | Diffraction peak intensity of (003) plane | Diffraction peak intensity of (004) plane | Intensity ratio (I(003)/I(104)) |
|---|---|---|---|
| Example 1 | 176742.2 | 51528.3 | 3.43 |
| Example 2 | 195973.0 | 45051.3 | 4.35 |
| Example 3 | 186255.5 | 47153.3 | 3.95 |
| Comparative Example 1 | 142423.4 | 56072.2 | 2.54 |
| Comparative Example 2 | 145448.5 | 51945.9 | 2.8 |
| Comparative Example 3 | 187542.4 | 64669.8 | 2.9 |

Referring to Table 2, the positive electrodes according to Examples 1 to 3 each exhibited an X-ray diffraction peak intensity ratio of greater than or equal to 3 of the (003) plane and (104) plane. In contrast, Comparative Examples 1 and 2, each having electrode plate mixture density of less than 3.4 g/cc, exhibited a peak intensity ratio of less than 3. Comparative Example 3 utilizing small particle diameter secondary particles instead of the small particle diameter monolith particles also exhibited a peak intensity ratio of less than 3.

Evaluation Example 2: High Temperature Stability

The high temperature stability of the rechargeable lithium battery cells according to Examples 1 to 3 and Comparative Examples 1 to 3 was evaluated. The high temperature stability was evaluated by full-charging pouch cells and then allowing them to stand at 60° C. for 12 days to measure the gas amounts generated in the cells, and the results are shown in Table 3. The gas generation amounts were measured utilizing the Archimedes method.

TABLE 3

|  | Gas generation amount dV (cc/g) | | | |
|---|---|---|---|---|
|  | After 3 days | After 6 days | After 9 days | After 12 days |
| Example 1 | 0.5 | 1.15 | 4.1 | 7.33 |
| Example 2 | 0.4 | 1.21 | 3.25 | 6.13 |
| Example 3 | 0.42 | 1.34 | 3.56 | 6.53 |
| Comparative Example 1 | 0.65 | 2.23 | 4.5 | 12.5 |
| Comparative Example 2 | 0.7 | 1.76 | 5.15 | 9.5 |
| Comparative Example 3 | 0.65 | 1.88 | 6.17 | 15 |

Referring to Table 3, the rechargeable lithium battery cells according to Examples 1 to 3 each exhibited a gas generation amount of less than or equal to 7.33 cc/g after 12 days at 60° C., which was smaller than the amounts generated by the rechargeable lithium battery cells according to Comparative Examples 1 to 3, corresponding to improved high temperature stability characteristics.

Evaluation Example 3: Capacity and Efficiency

In order to evaluate the capacity and efficiency of the rechargeable lithium battery cells according to Examples 1 to 3 and Comparative Examples 1 to 5, the cells were charged under a constant current at 0.1 C up to 4.25 V and then, charged under a constant voltage to 0.05 C. When the charge was completed, the cells were paused for about 10 minutes and discharged under a constant current at 0.1 C to a voltage of 3.0 V. The results of Examples 1 to 3 and Comparative Examples 4 and 5 are shown in Table 4.

In some embodiments, the cells were charged under a constant current at 0.2 C up to 4.25 V and then, charged under a constant voltage to 0.05 C. When the charge was completed, the cells were paused for about 10 minutes, and then discharged under a constant current at 0.2 C to a voltage of 3.0 V. The results of Examples 1 to 3 and Comparative Examples 4 and 5 are shown in Table 4.

TABLE 4

|  | 0.1 C | | | 0.2 C | | |
|---|---|---|---|---|---|---|
|  | Charge capacity (mAh/g) | Discharge capacity (mAh/g) | Efficiency (%) | Charge capacity (mAh/g) | Discharge capacity (mAh/g) | Efficiency (%) |
| Example 1 | 236.2 | 215.9 | 91.4 | 234.5 | 208.2 | 88.8 |
| Example 2 | 236.0 | 215.2 | 91.2 | 234.4 | 207.9 | 88.7 |
| Example 3 | 234.9 | 214.5 | 91.3 | 233.2 | 207.4 | 88.9 |
| Comparative Example 4 | 227.1 | 190.8 | 84.0 | 226.4 | 188.3 | 83.2 |
| Comparative Example 5 | 226.9 | 191.6 | 84.5 | 226.6 | 188.8 | 83.3 |

Evaluation Example 4: Cycle-Life

A cycle-life evaluation of the rechargeable lithium battery cells according to Examples 1 to 3 and Comparative Examples 1 to 5 was performed by charging the coin cells under a constant current at a 1.0 C rate up to 4.25 V (vs. Li) respectively at 25° C. and 45° C. and subsequently, cut off at a 0.05 C rate in a constant voltage mode of maintaining 4.25 V. Subsequently, the cells were discharged at the 1.0 C rate to 3.0 V (vs. Li), and this charge and discharge cycle was repeated up to $50^{th}$ cycle. In all the charge and discharge cycles, the cells were paused for 10 minutes after each charge/discharge cycle. Capacity retentions of the cells were calculated according to Equation 1, and the results are shown in Table 5.

Capacity retention rate at 50$^{th}$ cycle[%]=[Discharge capacity at 50$^{th}$ cycle/Discharge capacity at 1$^{st}$ cycle]×100      Equation 1

TABLE 5

|  | Capacity retention at 50$^{th}$ cycle (%) | |
| --- | --- | --- |
|  | 25° C. | 45° C. |
| Example 1 | 96.5 | 94.3 |
| Example 2 | 97.3 | 95.6 |
| Example 3 | 97.4 | 95.6 |
| Comparative Example 1 | 88.2 | 83.3 |
| Comparative Example 2 | 90.3 | 85.5 |
| Comparative Example 3 | 87.5 | 84.2 |
| Comparative Example 4 | 96.6 | 93.2 |
| Comparative Example 5 | 95.1 | 92.1 |

Referring to Tables 4 and 5, the rechargeable lithium battery cells of Examples 1 to 3 each exhibited suitable or excellent charge and discharge efficiency and a high capacity retention at the 50th cycle and accordingly, improved cycle-life characteristics. On the contrary, Comparative Examples 1 and 2 each exhibited relatively low capacity retention at 50 cycles, which were measured at 25° C. and 45° C., and thus provided insufficient cycle-life characteristics compared with the Examples. Comparative Example 3, in which small particle diameter secondary particles were applied instead of the small particle diameter monolith particles, exhibited relatively low capacity retention at the 50$^{th}$ cycle compared with the Examples, and thus provided insufficient cycle-life characteristics. In some embodiments, Comparative Examples 4 and 5, in which small particle diameter monolith particles were applied instead of the large particle diameter secondary particles, exhibited insufficient charge and discharge efficiency at 0.1 C and also, insufficient charge and discharge efficiency at 0.2 C. For example, in Comparative Examples 4 and 5, cracks were also observed due to increased residual stress in the electrode plates.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the present disclosure is not limited to the disclosed embodiments. On the contrary, it is intended to cover one or more suitable modifications and equivalent arrangements included within the spirit and scope of the appended claims and equivalents thereof.

DESCRIPTION OF SOME OF THE SYMBOLS

| 10: rechargeable lithium battery | 12: negative electrode |
| --- | --- |
| 13: positive electrode | 14: separator |
| 15: battery case | 16: cap assembly |

What is claimed is:

1. A positive electrode for a rechargeable lithium battery, the positive electrode comprising:
    a positive active material, comprising
        small particle diameter monolith particles having a particle diameter of about 1 μm to about 8 μm and comprising a first nickel-based lithium metal oxide; and
        large particle diameter secondary particles having a particle diameter of about 10 μm to about 20 μm and comprising a second nickel-based lithium metal oxide,
    wherein the positive electrode has a mixture density of greater than or equal to about 3.45 g/cc, and
    wherein an X-ray diffraction peak intensity ratio (I(003)/I(104)) of the positive electrode is greater than or equal to about 3.

2. The positive electrode of claim 1, wherein the X-ray diffraction peak intensity ratio (I(003)/I(104)) of the positive electrode is greater than or equal to about 3.4.

3. The positive electrode of claim 1, wherein the small particle diameter monolith particles and the large particle diameter secondary particles are included in a weight ratio of about 10:90 to about 60:40.

4. The positive electrode of claim 1, wherein the small particle diameter monolith particles have a particle diameter of about 3 μm to about 6 μm.

5. The positive electrode of claim 1, wherein the large particle diameter secondary particles have a particle diameter of about 12 μm to about 20 μm.

6. The positive electrode of claim 1, wherein the large particle diameter secondary particles have a form in which two or more primary particles are aggregated, and the primary particles have a particle diameter of about 20 nm to about 500 nm.

7. The positive electrode of claim 1, wherein the large particle diameter secondary particles are about 90 mol % or more of nickel based on 100 mol % of the total amount of transition metals in the second nickel-based lithium metal oxide.

8. The positive electrode of claim 1, wherein the large particle diameter secondary particles are a compound represented by Chemical Formula 1:

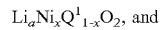, and      Chemical Formula 1 wherein, in Chemical Formula 1,
0.9≤a≤1.05, 0.9≤x≤0.98, and $Q^1$ is at least one element selected from Co, Mn, Al, Cr, Fe, Ca, B, V, Mg, Nb, Rb, Mo, Ta, W, Cu, Zn, Ga, In, La, Ce, Pr, Sn, Zr, Te, Ru, Ti, Pb, and Hf.

9. The positive electrode of claim 1, wherein the small particle diameter monolith particles are a compound represented by Chemical Formula 2:

$$Li_bNi_xQ^2_{1-y}O_2, \text{ and} \qquad \text{Chemical Formula 2}$$

wherein, in Chemical Formula 2,
0.9≤b≤1.05, 0.3≤y≤0.98, and $Q^2$ is at least one element selected from Co, Mn, Al, Cr, Fe, Ca, B, V, Mg, Nb, Rb, Mo, Ta, W, Cu, Zn, Ga, In, La, Ce, Pr, Sn, Zr, Te, Ru, Ti, Pb, and Hf.

10. A rechargeable lithium battery comprising the positive electrode of claim 1.

11. A method of preparing a positive electrode for a rechargeable lithium battery, the method comprising:
preparing a positive active material to comprise small particle diameter monolith particles having a particle diameter of about 1 μm to about 8 μm and comprising a first nickel-based lithium metal oxide, and large particle diameter secondary particles having a particle diameter of about 10 μm to about 20 μm and comprising a second nickel-based lithium metal oxide;
mixing the positive active material, a conductive agent, and a binder in a solvent to prepare a positive active material slurry;
coating the positive active material slurry on a current collector and drying it to form the positive electrode; and
compressing the positive electrode to have a density of greater than or equal to about 3.45 g/cc,
wherein an X-ray diffraction peak intensity ratio (I(003)/I(104)) of the positive electrode is greater than or equal to about 3.

12. The method of claim 11, wherein in the positive active material, the small particle diameter monolith particles and the large particle diameter secondary particles are included in a weight ratio of about 10:90 to about 60:40.

13. The method of claim 11, wherein the preparing of the positive active material slurry is performed by mixing about 90 wt % to about 98 wt % of the positive active material, about 1 wt % to about 5 wt % of the conductive agent, and about 1 wt % to about 5 wt % of the binder.

* * * * *